United States Patent [19]
Hähnke et al.

[11] Patent Number: 4,765,797
[45] Date of Patent: Aug. 23, 1988

[54] STORABLE FORMULATIONS OF CATIONIC DYES WITH OXIDIZING AGENT AS STABILIZER

[75] Inventors: Manfred Hähnke, Kelkheim; Sierling Ong, Hofheim am Taunus; Kurt Hohmann, Neu-Isenburg, all of Fed. Rep. of Germany

[73] Assignee: Hoechst Aktiengesellschaft, Frankfurt, Fed. Rep. of Germany

[21] Appl. No.: 58,983

[22] Filed: Jun. 8, 1987

Related U.S. Application Data

[63] Continuation of Ser. No. 879,106, filed as PCT EP85/00536 on Oct. 12, 1985, published as WO86/02658 on May 9, 1986, abandoned.

[30] Foreign Application Priority Data

Oct. 26, 1984 [DE] Fed. Rep. of Germany ....... 3439266

[51] Int. Cl.$^4$ ............................................ C09B 67/32
[52] U.S. Cl. .......................................... 8/654; 8/527; 8/607; 8/614; 8/623; 8/627; 8/634; 8/635; 8/655; 8/657; 8/659

[58] Field of Search ................... 8/654, 657, 607, 634, 8/635, 655, 659

[56] References Cited

U.S. PATENT DOCUMENTS 3,922,445 11/1975 Mizuno et al. ......................... 8/467

FOREIGN PATENT DOCUMENTS 54-030220 3/1979 Japan .
60-004559 1/1985 Japan .

Primary Examiner—A. Lionel Clingman
Attorney, Agent, or Firm—Connolly & Hutz

[57] ABSTRACT

Liquid formulations of mixtures of cationic dyes frequently have a very short storage life. As a consequence, these formulations give rise to customer complaints concerning incorrect dyeing strengths and hues and concerning isoluble constituents. It has now been found according to the invention that powder formulations and in particular liquid formulations of cationic dyes or of mixtures of these dyes can be stabilized by adding selected oxidizing agents.

11 Claims, No Drawings

STORABLE FORMULATIONS OF CATIONIC DYES WITH OXIDIZING AGENT AS STABILIZER

This application is a continuation of Ser. No. 879,106 filed as PCT EP85/00536 on Oct. 12, 1985, published as WO86/02658 on May 9, 1986 and abandoned.

All those skilled in the the art know that cationic dyes have a limited storage life. This applies to powder formulations and in particular to liquid formulations; and is especially true, however, of the liquid formulations of mixtures of cationic dyes.

Commercial products which are composed of dye mixtures are of great practical importance not only in the colored area but also in the navy and black sector. It is especially in the navy and black area that there is a preference in the field for the use of liquid formulations because of the weighing, dispensing, dissolving and dust problems which are particularly relevant with these shades (quantities).

Satisfactory storability is present when a dye or dye mixture within a customary temperature range remains stable for several months or several years without changes, i.e without suffering either dye strength losses or hue changes nor impairments in solubility. The customary temperature range is 0°–60° C., preferably 20°–40° C.

It is also known that, in the case of commercial dye products, it is possible to affect the storability through skillful choice of standardizing agents or solvents and through the establishment of the optimum pH value. Nonetheless, in particular in the case of liquid formulations of dye mixtures even consideration of these points has left many unfulfilled wishes on the part of those in the field (avoidance of offshade dyeings) and on the part of manufacturers (avoidance of customer complaints).

It has now been found, surprisingly, that the storability of cationic dyes, chiefly in the form of liquid formulations, and of these in turn in particular the liquid formulations of mixtures of cationic dyes can be oxidatively stabilized.

This result is above all also surprising because cationic dyes which have been dyed for example onto polyacrylonitrile fibers can in many cases be destroyed, i.e. weakened in shade or completely stripped/bleached, under suitable conditions (for example at the boil) by means of oxidizing agents.

The present invention thus provides storable formulations of cationic dyes, which are stabilized by the presence of oxidizing agents.

The oxidative stabilization according to the invention is effected through the addition of traditional oxidizing agents such as chloric acid, chlorous acid, bromic acid, iodic acid, perchloric acid, chromic acid, dichromic acid, vanadic acid, peroxodisulfuric acid or other oxidizing inorganic acids and salts thereof, iron(III) compounds and also by means of oxidizing organic compounds such as, for example, N-halogenamides, quinones, and the like.

The oxidizing agents which are used according to the invention are employed in amounts of 0.01 to 1%, preferably 0.1 to 0.5% (based on the weight of the dye formulation). The oxidizing agent is added to the dye as a solid substance or as an aqueous or organic solution. The oxidizing agents according to the invention can also be measured out by setting to a precisely defined value of the redox potential. It is also possible to employ a mixture of several oxidizing agents. In the case of liquid dyes, the oxidizing agents used according to the invention must be soluble therein.

The oxidative stabilization according to the invention can be used with a large number of cationic dyes, i.e. dyes which are protonatable in an acid medium. There may be mentioned in particular cyclammonium dyes, trialkylammonium dyes, anthraquinone dyes, triarylmethane dyes, methine dyes, azamethine dyes, diazamethine dyes, azine dyes, oxazine dyes or pyridiniumoxipyridone dyes.

The oxidative stabilization according to the invention is of very particular importance in the case of liquid formulations in the navy and black area which are based on mixtures of benzothiazolium blue dyes, of triazolium red dyes and of diazamethine yellow dyes or pyridiniumoxipyridone yellow dyes, and/or which may additionally contain malachite green.

The cationic dyes to be stabilized can come from the application field of textile dyeing (polyacrylonitrile fibers, modified polyester fibers) or of paper and wood dyeing. They can comprise individual dyes, but are preferably dye mixtures of 2 to 5, preferably 3, components.

In the case of liquid dyes the pH value therein can be between 1 and 6.

In the case of pulverulent dyes, the oxidizing agent used according to the invention can also be present as an intimate mixture with the dye, i.e. for example as an additive to a solution or suspension to be dried by spray drying.

The dye formulations which are obtainable according to the invention are distinguished by highly satisfactory storability, which is particularly noticeable in the case of the temperature range above 20° C. From a coloristic point of view there is, in addition to the storability, no effect on the outcome of dyeings.

The examples below serve to illustrate the inventive idea; parts and percentages are by weight.

EXAMPLE 1

A mixture is prepared from 31 parts of C.I. Basic Blue 41 (commercially available liquid brand with about 20% dye methosulfate, about 20% acetic acid and about 60% water), 13 parts of C.I. Basic Red 46 (commercially available liquid brand with about 25% dye methosulfate, about 25% acetic acid and about 50% water) and 11.5 parts of C.I. Basic Yellow 28 (commercially available liquid brand with about 40% dye acetate, about 15% acetic acid and about 45% water); 0.2 part of sodium chlorate is added; and the mixture is stirred until the sodium chlorate has dissolved.

The resulting formulation with a pH value of 1 to 1.5 constitutes a homogeneous solution which dyes polyacrylonitrile fibers in a deep black and which has a remarkably long storage life.

EXAMPLE 2

A formulation prepared as in Example 1 and a corresponding dye mixture which, for purposes of comparison, has been prepared without the addition of sodium chlorate are stored
(a) at 0° to 5° C. for 1 year
(b) at 20° C. for 1 year
(c) at 40° C. for 2 months
(d) at 60° C. for 1 month.

This is followed by testing, in each case in comparison with the freshly prepared dye mixtures, for the presence of any insoluble residue, by filtering through filter paper and briefly washing with water, and for any changes in dyeing strength and hue, by dyeing up on commercially available polyacrylonitrile fibers.

The results obtained are as follows:

(a) The oxidatively stabilized dye mixture exhibits no changes whatever after 1 year at 0° to 5° C., while the formulation which is free of sodium chlorate exhibits a small amount of black residue in the filtration test.

(b) The oxidatively stabilized dye mixture exhibits no changes whatever after 1 year at 20° C., while the formulation which is free of sodium chlorate exhibits a distinct black residue in the filtration test and a loss of 5% in dyeing strength.

(c) The oxidatively stabilized dye mixture shows no changes whatever after 2 months at 40° C., while the formulation which is free of sodium chlorate shows a large amount of black residue in the filtration test, a loss of 22% in dyeing strength and a much greener hue.

(d) The oxidatively stabilized dye mixture exhibits virtually no change after 1 month at 60° C., while the formulation which is free of sodium chlorate has been largely destroyed, as can be observed in the filtration test and in the case of the dyeing strength and the hue.

Examples 3 to 15

If in the method of Example 1 the sodium chlorate used there is replaced by one of the additives listed below or by a mixture of several additives, storable dye mixtures are likewise obtained.

| Example No. | Additive | Amount (parts) |
|---|---|---|
| 3 | Na bromate | 0.3 |
| 4 | K iodate | 0.3 |
| 5 | Na chlorate + | 0.1 |
|  | K perchlorate | 0.2 |
| 6 | K dichromate | 0.4 |
| 7 | NH4 chromate | 0.3 |
| 8 | Na chlorate + | 0.1 |
|  | Na chlorite | 0.1 |
| 9 | Na metavanadate | 0.5 |
| 10 | K peroxodisulfate | 0.4 |
| 11 | Na perborate* | 0.1 |
| 12 | NH4 iron alum | 1 |
| 13 | K hexacyanoferrate (III) | 1 |
| 14 | N bromosuccinimide | 0.1 |
| 15 | p-benzoquinone | 0.3 |

*as an addition compound of borate + H2O2

EXAMPLE 16

A mixture is prepared from 14 parts of C.I. Basic Blue 41 (a commercially available liquid brand of about 20% dye methosulfate, about 20% acetic acid and about 60% water), 5 parts of C.I. Basic Red 22 (commercially available liquid brand with about 40% dye methosulfate, about 20% acetic acid and about 40% water), 5 parts of C.I. Basic Red 18.1 (commercially available liquid brand with about 45% dye acetate, 15% acetic acid, 40% water), 2 parts of C.I. Basic Yellow 29 (commercially available liquid brand with about 20% dye acetate, 20% acetic acid, 60% water) and 2 parts of C.I. Basic Yellow 82 (corresponding to a commercially available liquid brand with about 15% dye chloride, 70% acetic acid, 15% water); 0.5 part of a 10% strength aqueous solution of sodium chlorate is added, and the pH value is brought to 2.5 to 3 by addition of sodium acetate. The resulting formulation dyes polyacrylonitrile fibers navy and has a very long storage life.

EXAMPLE 17

A mixture is prepared from 50 parts of C.I. Basic Blue 54 (commercially available liquid brand with about 25% dye methosulfate, 25% acetic acid, 5% formic acid, 45% water) and 5 parts C.I. Basic Red 46 (commercially available liquid brand with about 25% dye methosulfate, about 25% acetic acid and about 50% water). This mixture shows 315 mV in a redox potential measurement (Pt 4805 measuring electrode from Ingold). Sufficient 10% strength aqueous sodium chlorate solution is then added to obtain a redox potential of 340 mV.

The resulting dye formulation dyes polyacrylonitrile fibers dark blue and is storble.

EXAMPLE 18

A pulverulent dye mixture is prepared from 20 parts of C.I. Basic Violet 2, 2 parts of C.I. Basic Blue 41, 1 part of C.I. Basic Green 4 and 1 part of potassium dichromate.

This mixture dyes polyacrylonitrile fibers, anionically modified polyester fibers, tannin-mordanted paper or wood violet, and is storable.

EXAMPLE 19

A suspension is prepared from 25 parts of water, 6 parts of C.I. Basic Blue 41 (100% pure as chlorozincate), 1.5 parts of C.I. Basic Yellow 28 (100% pure as chloride) and 1 part of C.I. Basic Red 112 (100% pure as methosulfate).

Addition of 0.5 part of 10% strength sodium chlorate solution and 50 parts of sodium sulfate is followed by drying in a customary spray drying process.

The result obtained without marked decomposition in the spray drying process is 80 parts of a navy formulation in powder form, which has a very long storage life.

EXAMPLE 20

A mixture is prepared from 5 parts of C.I. Basic Blue 41 (commercially available liquid brand with about 20% dye methosulfate, about 20% acetic acid and about 60% water), 2 parts of C.I. Basic Blue 3 (commercially available liquid brand with about 30% dye chloride, 10% acetic acid, 10% ethylene glycol, 50% water), 10 parts of C.I. Basic Red 22 (commercially available liquid brand with about 40% dye methosulfate, 20% acetic acid, 40% water), 5 parts of C.I. Basic Red 18.1 (commercially available liquid brand with about 45% dye acetate, 25% acetic acid, 30% water), 20 parts of C.I. Basic Yellow 28 (commercially available liquid brand with about 40% dye acetate, about 15% acetic acid and about 45% water) and 2 parts of 10% strength aqueous potassium dichromate solution.

This dye mixture dyes polyacrylonitrile fibers brown and is storable.

EXAMPLE 21

A mixture is prepared from 20 parts of C.I. Basic Yellow 21 (commercially available liquid brand with about 20% dye chloride, 20% acetic acid, 60% water), 3 parts of C.I. Basic Blue 41 (commercially available liquid brand with about 20% dye methosulfate, about 20% acetic acid and about 60% water), 3 parts of C.I. Basic Blue 147 (commercially available liquid brand with about 20% dye acetate, 20% acetic acid, 60% water) and 0.5 part of C.I. Basic Red 14 (commercially available liquid brand with about 40% dye acetate, 20% acetic acid, 40% water).

After addition of 1 part of 10% strength aqueous sodium chlorate solution a storable green formulation is obtained.

EXAMPLE 22

A mixture is prepared from 80 parts of C.I. Basic Blue 41 (commercially available liquid brand with about 20% dye methosulfate, about 20% acetic acid and about 60% water), 10 parts of C.I. Basic Blue 22 (commercially available liquid brand with about 35% dye acetate, 15% acetic acid, 50% water), 10 parts of C.I. Basic Violet 16 (commercially available liquid brand with about 40% dye acetate, 20% acetic acid, 40% water), 10 parts of C.I. Basic Yellow 21 (commercially available liquid brand with about 20% dye chloride, 20% acetic acid, 60% water) and 1 part of sodium peroxodisulfate.

This mixture dyes polyacrylonitrile fibers navy and is storable.

EXAMPLE 23

A mixture is prepared from 10 parts of C.I. Basic Blue 41 (commercially available liquid brand with about 20% dye methosulfate, about 20% acetic acid and about 60% water), 50 parts of C.I. Basic Red 46 (commercially available liquid brand with about 25% dye methosulfate, about 25% acetic acid and about 50% water), 10 parts of C.I. Basic Yellow 28 (commercially available liquid brand with about 40% dye acetate, about 15% acetic acid and about 45% water) and 0.1 part of sodium chlorate.

This mixture dyes polyacrylonitrile fibers bluish red and is storable.

EXAMPLE 24

A mixture is prepared from 80 parts of C.I. Basic Blue 41 (commercially available liquid brand with about 20% dye methosulfate, about 20% aFetic acid and about 60% water), 5 parts of C.I. Basic Red 46 (commercially available liquid brand with about 25% dye methosulfate, about 25% acetic acid and about 50% water), 5 parts of a red dye of the formula

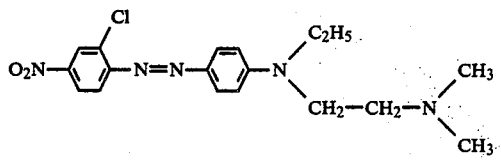

and 1 part of sodium chlorate.

This formulation dyes polyacrylonitrile fibers navy and is storable.

EXAMPLE 25

A mixture is prepared from 60 parts of C.I. Basic Blue 41 (commercially available liquid brand with about 20% dye methosulfate, about 20% acetic acid and about 60% water), 20 parts C.I. Basic Green 4 (commercially available liquid brand with about 40% dye acetate, 10% acetic acid, 50% water), 10 parts C.I. Basic Red 22 (commercially available liquid brand with about 40% dye methosulfate, 20% acetic acid, 40% water) and 5 parts C.I. Basic Yellow 28 (commercially available liquid brand with about 20% dye chloride, 10% acetic acid, 70% water). After addition of 0.3 part of sodium chlorate a navy formulation which has a very long storage life is obtained.

We claim:

1. A process for the long-storage stabilization of aqueous liquid formulations of cationic or in an acidic medium protanatable dyes, or of mixtures of such dyes, containing water in addition to the respective colorant, which comprises adding to the commercial brand of such a dye or dyes, present in form of a homogeneous solution, at least one inorganic or organic oxidizing agent in amounts of from 0.01 to 1%, based on the weight of the dye formulation, for the purpose of safeguarding the tinctorial strength and shade constancy of the said dye formulation during the storage thereof at environmental temperatures in the range of from 0° to 60° C.

2. The process as claimed in claim 1, wherein the dye formulation further contains one or more water-miscible organic solvents.

3. The process as claimed in claim 1, wherein the dye formulation further contains organic or inorganic acids or both.

4. The process as claimed in claim 1, wherein the colorants to be stabilized are composed of a mixture comprising 2 to 5 different cationic dyes.

5. The process as claimed in claim 1, wherein the oxidizing agents for the stabilization are those from the series of chloric acid, chlorous acid, bromic acid, iodic acid, perchloric acid, chromic acid, dichromic acid, vanadic acid, peroxodisulfuric acid or salts thereof, iron(III) compounds or oxidizing organic compounds from the series of N-halogenamides or quinones.

6. The process as claimed in claim 5, wherein the oxidizing agents are chloric acid or bromic acid, or the sodium, potassium or ammonium salts thereof.

7. The process as claimed in claim 1, wherein to obtain stabilization, the amount of the oxidizing agent or agents is of from 0.1 to 0.5%, on the same basis.

8. The process as claimed in claim 1, wherein, to obtain stabilization, mixtures of 2 or more oxidizing agents are used.

9. The process as claimed in claim 1, wherein the measuring out of the amount of the oxidizing agent or agents provided for stabilization purposes is controlled by the measurement of the redox potential.

10. The process as claimed in claim 1, wherein the dyes to be stabilized are those from the series of the cyclammonium dyes, trialkylammonium dyes, anthraquinone dyes, triarylmethane dyes, methine dyes, azamethine dyes, diazamethine dyes, azine dyes, oxazine dyes or pyridiniumoxypyridone dyes.

11. The process as claimed in claim 1, wherein the dyes to be stabilized are those from the series of the benzothiazolium blue dyes, triazolium red dyes, diazamethine yellow dyes, pyridiniumoxypyridone yellow dyes and/or malachite green.

* * * * *